(12) United States Patent
Messing et al.

(10) Patent No.: US 11,999,405 B2
(45) Date of Patent: Jun. 4, 2024

(54) NO-BACK SPRING APPARATUS

(71) Applicant: Steering Solutions IP Holding Corporation, Saginaw, MI (US)

(72) Inventors: Matthew L. Messing, Saginaw, MI (US); Jacob A. Caverly, Freeland, MI (US); Douglas M. Schneider, Frankenmuth, MI (US); Margaret R. Szeliga, Essexville, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 154 days.

(21) Appl. No.: 17/703,142

(22) Filed: Mar. 24, 2022

(65) Prior Publication Data

US 2022/0306181 A1    Sep. 29, 2022

Related U.S. Application Data

(60) Provisional application No. 63/167,382, filed on Mar. 29, 2021.

(51) Int. Cl.
*B62D 1/16* (2006.01)
*F16C 27/04* (2006.01)

(52) U.S. Cl.
CPC ............... *B62D 1/16* (2013.01); *F16C 27/04* (2013.01); *F16C 2326/24* (2013.01)

(58) Field of Classification Search
CPC . B62D 1/16; B62D 5/005; F16C 27/04; F16C 2326/24
See application file for complete search history.

(56) References Cited

U.S. PATENT DOCUMENTS 1,738,037 A * 12/1929 Collins ............... B62D 1/16
                                                          384/296
3,960,418 A *  6/1976 Bracken .............. F16C 27/04
                                                          384/535
(Continued)

FOREIGN PATENT DOCUMENTS

DE        69702541 T2    3/2001
DE        19961709 A1    7/2001
(Continued)

OTHER PUBLICATIONS

English translation of First Office Action regarding corresponding DE App. No. 10 2022 118 074.3; dated Sep. 23, 2022.

*Primary Examiner* — Frank B Vanaman
(74) *Attorney, Agent, or Firm* — Dickinson Wright PLLC

(57) ABSTRACT

A no-back spring apparatus includes a body having an annular shape extending between an outer diameter and an inner diameter, the body comprising a first axial side and a second axial side, the second axial side including a flat portion extending from the inner diameter toward the outer diameter. The no-back spring apparatus also includes a plurality of retaining fingers circumferentially spaced from each other and integrally formed with the body and extending radially outwardly from the outer diameter. The no-back spring apparatus further includes a plurality of spring elements integrally formed with the body, each of the plurality of spring elements including a tab portion extending radially inwardly from the inner dimeter.

6 Claims, 4 Drawing Sheets

(56) References Cited

U.S. PATENT DOCUMENTS

| | | | | |
|---|---|---|---|---|
| 4,364,615 | A * | 12/1982 | Euler | F16C 35/063 |
| | | | | 384/903 |
| 5,044,784 | A * | 9/1991 | Lisowsky | F16C 27/066 |
| | | | | 384/582 |
| 5,531,526 | A * | 7/1996 | Labedan | F16C 35/077 |
| | | | | 384/536 |
| 5,720,102 | A * | 2/1998 | McClanahan | F16C 3/03 |
| | | | | 156/289 |
| 5,829,891 | A * | 11/1998 | Beaman | F16C 35/073 |
| | | | | 384/495 |
| 6,179,473 | B1 * | 1/2001 | Ponson | F16C 25/083 |
| | | | | 384/537 |
| 6,227,715 | B1 * | 5/2001 | Erhardt | F16C 25/083 |
| | | | | 384/537 |
| 6,375,360 | B1 * | 4/2002 | Weisskopf | F16C 35/073 |
| | | | | 384/538 |
| 2004/0124044 | A1 * | 7/2004 | Landrieve | F16D 65/186 |
| | | | | 188/218 R |
| 2005/0044980 | A1 * | 3/2005 | Minamoto | B62D 1/185 |
| | | | | 74/493 |

FOREIGN PATENT DOCUMENTS

| | | |
|---|---|---|
| DE | 10214276 A1 | 10/2003 |
| DE | 60110511 T2 | 2/2006 |

* cited by examiner

NO-BACK SPRING APPARATUS

CROSS-REFERENCE TO RELATED APPLICATION

This application claims priority to U.S. Provisional Patent Application Ser. No. 63/167,382, filed Mar. 29, 2021, the disclosure of which is incorporated by reference herein in its entirety.

TECHNICAL FIELD

This disclosure relates to a no-back spring apparatus and, in particular, to a no-back spring apparatus for bearing assembly in a vehicle steering system.

BACKGROUND

A vehicle, such as a car, truck, sport utility vehicle, crossover, mini-van, marine craft, aircraft, all-terrain vehicle, recreational vehicle, or other suitable vehicles, includes various steering system schemes, for example, steer-by-wire and driver interface steering. These steering system schemes typically include a steering column for translating steering input to an output that interacts with a steering linkage to ultimately cause the vehicle wheels (or other elements) to turn the vehicle.

Steering columns typically include a jacket assembly (i.e., one or more jackets operatively coupled to each other) with a steering shaft located within the jacket assembly. The steering shaft is operably connected on a first end to a steering input, such as a steering wheel, and an output on a second end, such as a pinion shaft assembly or a device that is part of a steer-by-wire system. When the steering wheel is turned, the steering shaft rotates within the jacket assembly to interact (mechanically directly or indirectly) with the steering linkage. Typically, the jacket assembly is mounted to a component of the vehicle, such that it cannot rotate and a bearing assembly permits the steering shaft to rotate relative to the jacket assembly.

Depending on end-use requirements and preferences, there is typically a maximum turning torque requirement that can be fulfilled with traditional bearing assemblies. However, as technology continues to advance there have also been requirements and preferences to set a minimum turning torque requirement. To meet this growing need, torque adjustment devices have been developed that target a narrow range between maximum and minimum torque requirements.

There are a number of traditional bearing assembly configurations that typically include an inner race operably connected to the steering shaft and an outer race operably connected to the jacket assembly that are separated by ball bearings. Current torque adjustment devices use a plastic bearing sleeve sandwiched between the inner race and a splined portion of the steering shaft. The plastic bearing sleeve defines a frictional surface and an axial spring preloads against the frictional surface and is axially retained with a no-back washer that interfaces with the jacket assembly. No-back washers are typically configured to be inserted in one direction, but hard to remove in an opposite direction to axially retain adjacent components. In use, the axial spring is intended to remain stationary while the steering shaft rotates due to the difference of friction interfaces, i.e. dry steel-on-steel between the no-back washer and axial spring versus lubricated steel of the axial spring on the plastic bearing sleeve frictional surface. This relative rotation between the plastic bearing sleeve and axial spring generates friction, thus adding torque to establish the minimum torque requirements.

While the above described torque adjustment device provides improvement to traditional steering shafts, they are not without shortcomings. For example, prolonged usage can result in changes to the friction surface of the bearing sleeve. In addition, the axial spring sometimes partially rotates and winds-up before the plastic bearing sleeve begins to slide relative to the frictional surface. Therefore, longevity of control as well as increasing spring geometry deflection and preload continues to be problematic. In addition, these issues are accentuated with higher torque requirements and preferences.

Accordingly, improvements in torque adjustment devices continue to be of interest, particularly improvements on weight, simplicity of design, consistency of operation, and longevity of service life.

SUMMARY

According to one aspect of the disclosure, a bearing retention assembly for a vehicle steering system includes a housing structure. The bearing retention assembly also includes a steering shaft disposed within a bore of the housing structure. The bearing retention assembly further includes a bearing sleeve surrounding a portion of an outer surface of the steering shaft. The bearing retention assembly yet further includes a bearing assembly comprising an inner race and an outer race with a plurality of balls disposed between the inner race and the outer race, wherein the inner race is located between the bearing sleeve and the outer race. The bearing retention assembly also includes a no-back spring apparatus having a body formed in an annular shape extending between an outer diameter and an inner diameter. The no-back spring apparatus also includes at least one retaining finger integrally formed with the body and extending radially outwardly from the outer diameter for axially retaining the no-back spring apparatus within the housing structure. The no-back spring apparatus further includes at least one spring element integrally formed with the body and extending axially from the body and in contact with a frictional surface of the bearing sleeve.

According to another aspect of the disclosure, a no-back spring apparatus includes a body having an annular shape extending between an outer diameter and an inner diameter, the body comprising a first axial side and a second axial side, the second axial side including a flat portion extending from the inner diameter toward the outer diameter. The no-back spring apparatus also includes a plurality of retaining fingers circumferentially spaced from each other and integrally formed with the body and extending radially outwardly from the outer diameter. The no-back spring apparatus further includes a plurality of spring elements integrally formed with the body, each of the plurality of spring elements including a tab portion extending radially inwardly from the inner dimeter.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1 generally illustrates a partial, cross-sectional view of a steering column assembly including a no-back spring apparatus according to the principles of the present disclosure.

DETAILED DESCRIPTION

Figure 1:
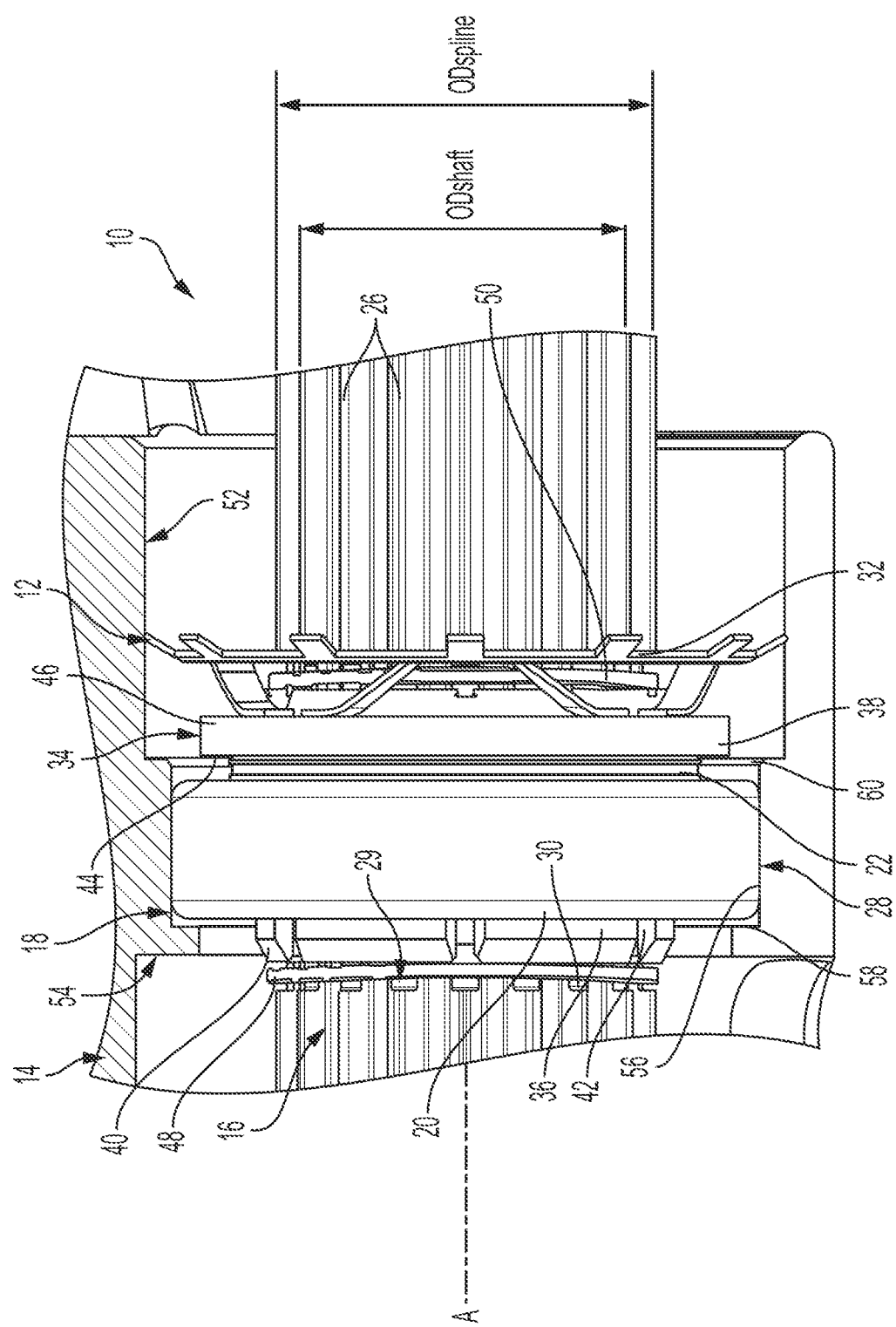

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, features of the subject disclosure may be incorporated into a vehicle, such as a car, truck, sport utility vehicle, crossover, mini-van, marine craft, aircraft, all-terrain vehicle, recreational vehicle, or other suitable vehicles, that include various steering system schemes, for example, steer-by-wire and driver interface steering. These steering system schemes may include a steering column assembly for translating steering input to an output that interacts with a steering linkage to ultimately cause the vehicle wheels (or other elements) to turn the vehicle. These steering systems may further include configurations that permit the steering column assembly to be axially adjusted or angularly (rake) adjusted.

Referring now to the drawings, where the various embodiments are shown and described herein, without limiting same, FIGS. 1 through 4 illustrate a no-back spring apparatus for a steering column assembly within a vehicle steering system. The no-back spring apparatus incorporates both an axial spring and a no-back washer functionality into an integrally formed, thinly-shaped body that provides improvements on weight, simplicity of design, consistency of operation, and longevity of service life.

Figure 2:
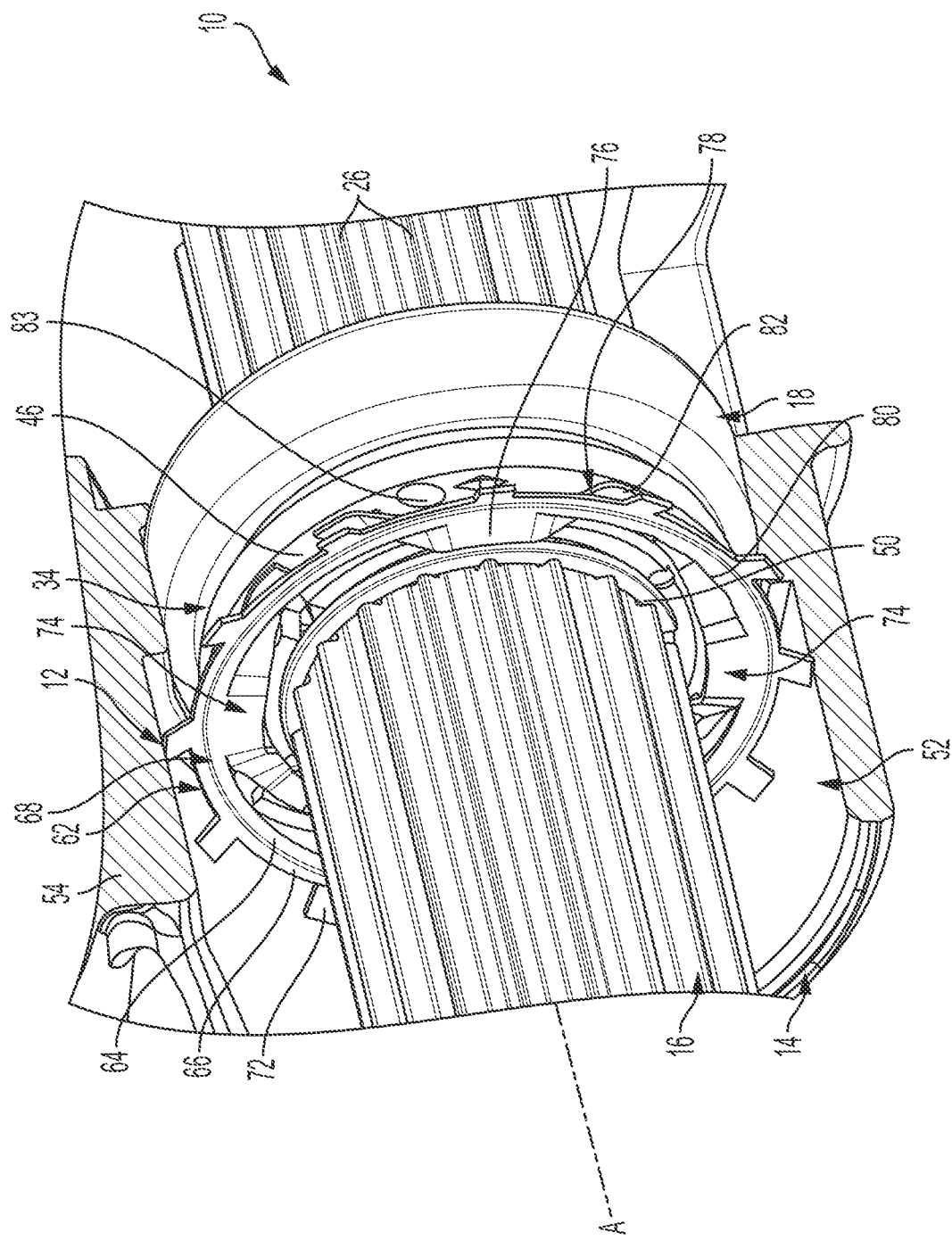
FIG. 2 generally illustrates a partial, cross-sectional view of the steering column assembly according to the principles of the present disclosure.

Referring initially to FIGS. 1 and 2, a steering column assembly 10 is illustrated and generally referenced with numeral 10. The steering column assembly 10 includes a no-back spring apparatus 12 for establishing at least one of a minimum and maximum torque requirement of the steering column assembly 10. The steering column assembly 10 includes a housing structure 14, which may be part of a column jacket assembly. For example, the housing structure 14 may be a jacket that is part of a jacket assembly having one or more jackets which radially surround a steering shaft 16. Regardless of the particular housing structure 14, the housing structure 14 defines a cavity extending along an axis A and the steering shaft 16 is located within the cavity. The steering shaft 16 is configured to rotate during steering maneuvers, while the housing structure 14 is rotationally stationary relative to the steering shaft 16. A bearing assembly 18 facilitates relative rotational movement between the steering shaft 16 and the housing structure 14.

The bearing assembly 18 may include an outer race 20 and an inner race 22, with the inner race 22 being radially inward of the outer race 20. A plurality of bearing elements (not shown) may be located between the outer race 20 and the inner race 22 and facilitate relative rotation therebetween. In some embodiments, the bearing elements may have spherical-shapes. In some embodiments, the outer race 20 is operably and statically connected to the housing structure 14, and the inner race 22 is operably and statically connected to the steering shaft 16. In some embodiments, the steering shaft 16 may include upper and lower portions and the bearing assembly 18 and no-back spring apparatus 12 may be located on the lower portion. In embodiments of the steering shaft 16 having an upper and lower portion, the portions may be joined via a splined connection (not shown).

In some embodiments, at least a portion of a radially outer surface of the steering shaft 16 defines a series of spines 26 circumferentially arrayed around, and axially extending along, the axis A. In some embodiments, the portion of the steering shaft 16 defining the splines 26 further includes a retaining region 28 that is annular about the steering shaft 16. The retraining region 28 extends axially between a first edge 30 and a second edge 32. The bearing assembly 18 and no-back spring apparatus 12 are located at the retaining region 28 between the first edge 30 and the second edge 32. In particular, a bearing sleeve 34 is keyed to the shaft splines 26 and has an interference fit to the inner race 22. The steering shaft 16 is splined under the bearing 34 sleeve. A pair of retaining grooves 29 are formed in the shaft splines 26 to accommodate a pair of retaining rings 48, 50, which assist with axially retaining the position of the bearing assembly 18.

With continued reference to FIGS. 1 and 2, a bearing sleeve 34 is located between the inner race 22 and the steering shaft 16 in the retaining region 28. The bearing sleeve 34 includes a frayed portion 36 adjacent to the first edge 30 and a flanged portion 38 adjacent to the second edge 32. The frayed portion 36 extends to a tapered edge 40 and includes a series of axially extending slots 42. The axially extending slots 42 permit circumferential expansion and contraction of the frayed portion 36. The flanged portion 38 extends radially outwardly and defines a bearing surface 44 facing the bearing assembly 18 and a frictional surface 46 facing the no-back spring apparatus 12. A pair of retaining rings axially retain the bearing assembly 18 and the bearing sleeve 34 within the retraining groove 28. The pair of retaining rings includes a first retaining ring 48 located in the retaining groove 29 adjacent to the first edge 30 and a second retaining ring 50 located in the retaining groove 29 adjacent to the second edge 32. In some embodiments, the first retaining ring 48 and the second retaining ring 50 both include an inner diameter positioned radially inward of the outer diameter ODsplines of the splines 26. In some embodiments, the first retaining ring 48 and the second retaining ring 50 both include an inner diameter positioned radially outward of the outer diameter ODshaft of the steering shaft 16.

The housing structure 14 includes an inner surface 52 that the outer race 20 is press fit to. The housing structure defines an annular projection 54 for locating the outer race 20 during assembly in some embodiments. More particularly, the annular projection 54 is annularly shaped and projects radially inwardly to define a first surface 56 that contacts an outer diameter of the outer race 20 for radially retaining the outer race 20. The annular projection 54 further includes a step 58 extending further radially inwardly from the first surface 56 for contacting a side of the outer race 20 facing the first edge 30 for axially retaining the outer race 20 during assembly, but the outer race 20 is press fit to the housing 14. The first surface 56 may include a taper 60 opposite the step 58 to facilitate insertion of the bearing assembly 18.

FIG. 2 generally illustrates a perspective view of the steering column assembly 10, with the housing structure 14 sectioned, and illustrates various features of the no-back spring apparatus 12. The no-back spring apparatus 12 includes a body 62 having a generally annular shape that extends between an inner diameter and an outer diameter. The body 62 includes a flat portion 64 extending from the inner diameter and an angled portion 66 extending from the outer diameter to the flat portion 64. The no-back spring apparatus 12 includes a first surface 68 (FIG. 3) and a second surface 70 (FIG. 4) that is opposite the first surface 68. The first surface 68 faces away from the bearing assembly 18 and the second surface 70 faces the bearing assembly 18. A series of retaining fingers 72 extend from the angled portion 66 radially outwardly from the outer diameter and away from the second surface 70 and the bearing assembly 18 to an outer retaining finger diameter that may be equal to or slightly more than a diameter defined by the inner surface 52 of the outer jacket 14.

A series of spring elements 74 extend radially inwardly from the inner diameter away from the first surface 68 and towards the bearing assembly 18. The retaining fingers 72 and the spring elements 74 are circumferentially arrayed with respect to the body 62. The spring elements 74 include a tab portion 76 extending radially inwardly from the inner dimeter. In some embodiments, the tab portion 76 is coplanar to the flat portion 64. A pair of spring fingers 78 extend circumferentially from opposite sides of the tab portion 76. Each spring finger 78 includes an angled spring portion 80 extending toward the bearing assembly 18 and a flat spring portion 82 in contact with the frictional surface 46. In some embodiments, the no-back spring apparatus 18 is formed of spring steel and the bearing sleeve 34 is formed of a plastic. In some embodiments, a lubrication 83 is located on the frictional surface 46. In some embodiments, at least one of the spring elements 74 is circumferentially aligned with at least one retaining finger 72. In some embodiments, each of the spring elements 74 are circumferentially aligned with at least one retaining finger 72. In some embodiments, there are less spring elements 74 than retaining fingers 72. In some embodiments, each of the tab portions 76 and the flat spring portions 82 are circumferentially aligned with at least one retaining finger 72.

Figure 3:
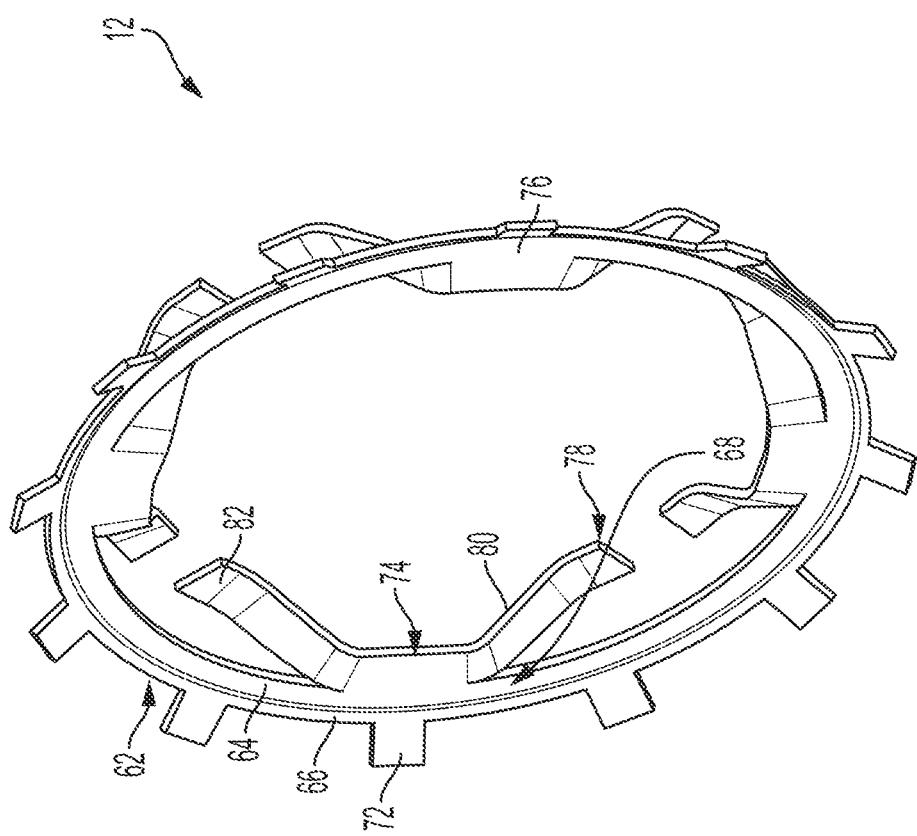
FIG. 3 is a perspective view of a first axial side of the no-back spring apparatus according to the principles of the present disclosure.
Figure 4:
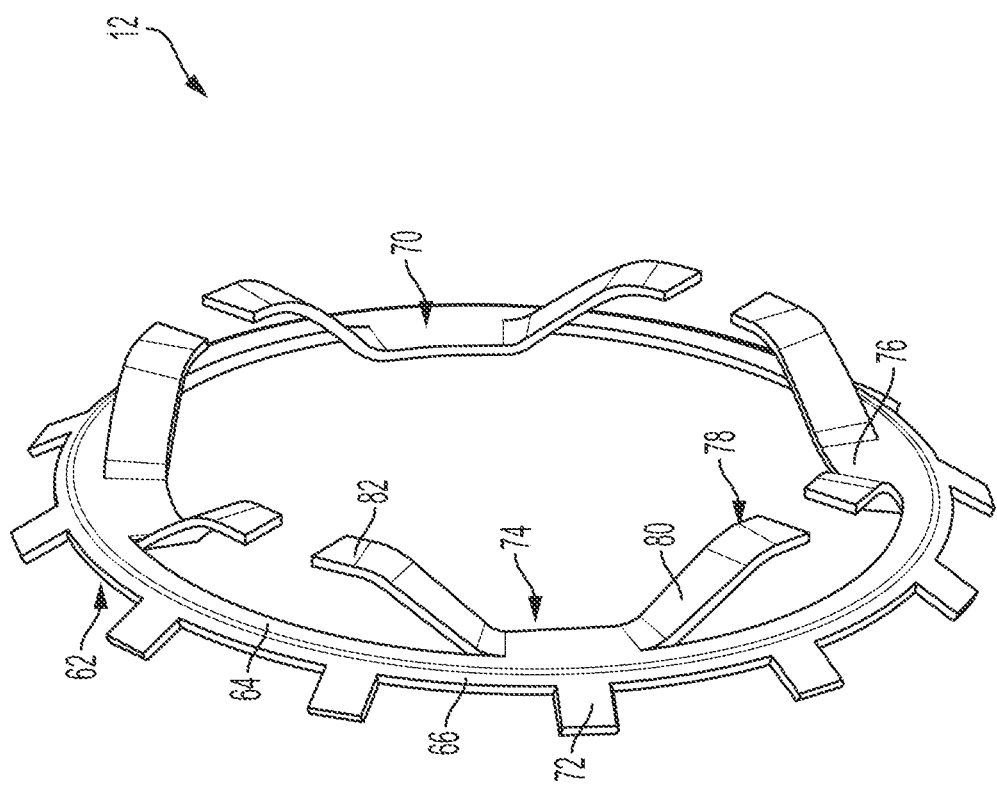
FIG. 4 is a perspective view of a second axial side of the no-back spring apparatus according to the principles of the present disclosure.

FIG. 3 is a perspective view of a first axial surface 68 of the no-back spring apparatus 12 isolated from the other components of the steering column assembly 10. FIG. 4 is a perspective view of a second axial surface 70 of the no-back spring apparatus 12 isolated from the other components of the steering column assembly 10.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A bearing retention assembly for a vehicle steering system comprising:
    a housing structure;
    a steering shaft disposed within a bore of the housing structure;
    a bearing sleeve surrounding a portion of an outer surface of the steering shaft;
    a bearing assembly comprising an inner race and an outer race with a plurality of balls disposed between the inner race and the outer race, wherein the inner race is located between the bearing sleeve and the outer race; and
    a no-back spring apparatus comprising:
        a body formed in an annular shape extending between an outer diameter and an inner diameter;
        at least one retaining finger integrally formed with the body and extending radially outwardly from the outer diameter for axially retaining the no-back spring apparatus within the housing structure; and
        at least one spring element integrally formed with the body and extending axially from the body and in contact with a frictional surface of the bearing sleeve,
    wherein the body comprises a first axial side and a second axial side, wherein the first axial side faces away from the bearing sleeve, wherein the second axial side faces towards the bearing sleeve, wherein the second axial side includes a flat portion extending from the inner diameter toward the outer diameter, wherein the at least one spring element extends radially inwardly from the inner diameter of the body of the no-back spring apparatus, wherein the at least one spring element includes a tab portion extending radially inwardly from the inner dimeter, wherein the at least one spring element includes a pair of spring fingers, each of the spring fingers extending circumferentially from opposite sides of the tab portion, wherein each of the spring fingers includes an angled spring portion extending axially toward the bearing sleeve, each of the spring fingers including a flat spring portion in contact with the frictional surface of the bearing sleeve.

2. The bearing retention assembly of claim 1, wherein the at least one retaining finger comprises a plurality of fingers circumferentially spaced from each other.

3. The bearing retention assembly of claim 2, wherein the plurality of fingers are angled away from the bearing sleeve.

4. The bearing retention assembly of claim 1, wherein the steering shaft has a splined outer surface, the steering shaft having a retaining region that the bearing assembly is disposed within.

5. The bearing retention assembly of claim 1, wherein the no-back spring apparatus is formed of spring steel and the bearing sleeve is formed of a plastic.

6. The bearing retention assembly of claim 1, wherein lubrication is present on the frictional surface of the bearing sleeve.

\* \* \* \* \*